United States Patent Office 3,281,248
Patented Oct. 25, 1966

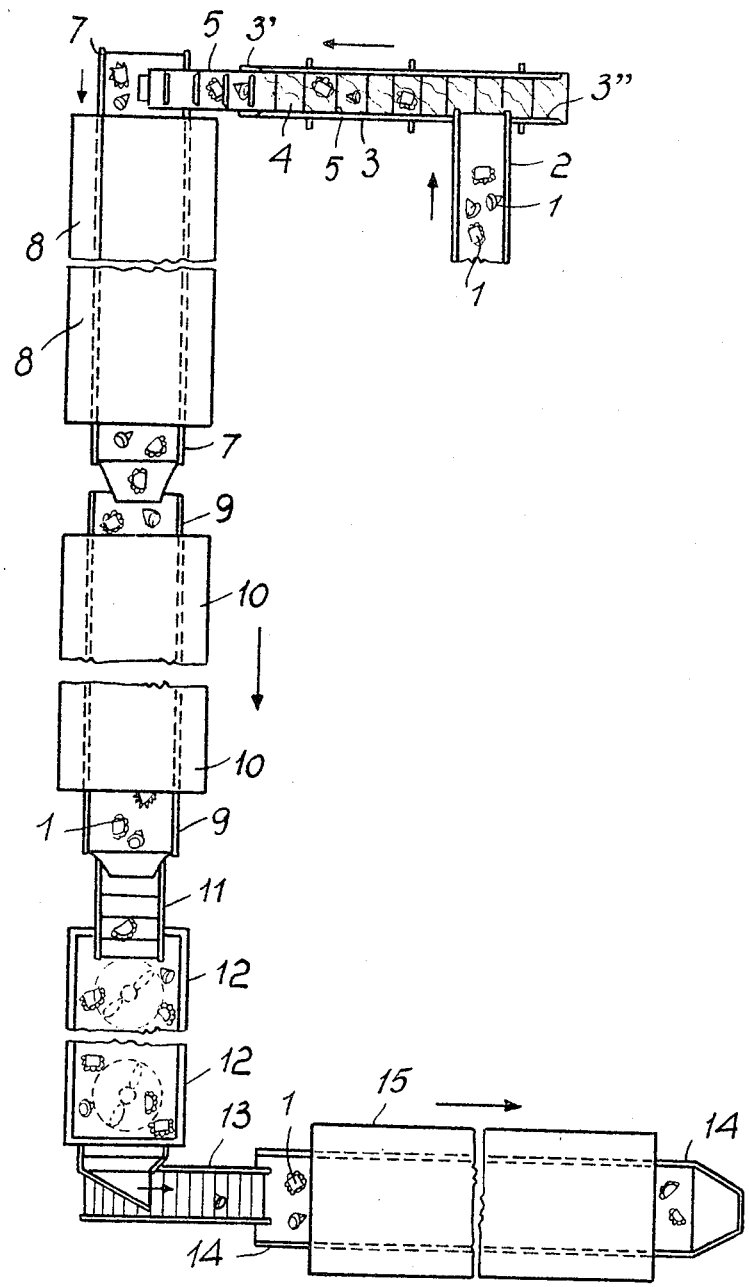

3,281,248
PROCESS FOR TREATING STUFFED
ALIMENTARY PASTES
Mario Fioravanti and Guido Fioravanti, both of
Via Lucini 19, Milan, Italy
Filed June 5, 1963, Ser. No. 285,786
Claims priority, application Italy, June 9, 1962, 11,655/62
4 Claims. (Cl. 99—85)

This invention relates to a process for obtaining enduring high quality stuffed alimentary pastes in general such as, for example, ravioli, tortellini, cannelloni and the like suitable to be preserved in a good state for a long period of time.

It is known that long ago the problem has arisen for the producer of stuffed pastes in general to preserve in a good state for a certain period of time the aforesaid stuffed alimentary pastes, and particularly for a time that, in the ever-increasing industrial production of said pastes, runs between the production and consumption.

Several processes have been proposed heretofore for treating the stuffed pastes in such a way that the latter does not undergo alterations neither in the paste portion thereof constituting a kind of shell nor in the stuffing constituted generally of force meat, greens and other foodstuffs, which alterations make the product not only disagreeable but at times also un-eatable.

One of the processes known heretofore utilized to obtain a longer storage time of the stuffed pastes consists in drying the product in special driers. Such a process, besides the inconvenience that the pastes do not have an adequate sterilization for their good storage, involves the immobilization of a considerable quantity of product and hence of money because of the slow drying to which the material has to be subjected.

It is well known, in fact, that in such a process, each drying stage has to be followed by a so-called recovery stage for allowing that the residual internal humidity of the paste gradually reaches the surface and is removed during a subsequent drying stage.

In addition to the above facts, there is a further inconvenience of the mentioned drying process consisting in the need of skilled labor because even a small variation of the humidity degree inside the drier can ruin all the material.

Another process proposed for the preservation of stuffed alimentary pastes consists in the freezing or overfreezing of the pastes into special cooling equipments.

It occurred in practice that such a process based on the freezing of the product, besides requiring an expensive equipment for the initial treatment, also involves the necessity of providing low temperature storage rooms, both in the magazines for the storage of the paste and in the places of consumption, such as stores and the like.

A conservation process has also been proposed, which is based on the canning of the product and subsequent processing in autoclaves at high temperature in an analogous manner to that used for the treatment of canned meat. This process, based on the canning of the product, which is here generally prepared in an already seasoned condition, compels the consumer to eat a product already cooked and seasoned with more or less agreeable condiments and with rather an overdone paste. Still another process proposed by the technique for the preservation of alimentary pastes, particularly of stuffed pastes, consists in making up suitable bags of plastic material in which the product to be preserved is packed.

The plastic bags filled with alimentary paste are put into an autoclave for counter-pressure sterilization in order to avoid swelling and hence the bursting of the bag itself due to a strong increase in volume or swelling, due to the internal humidity. It has been found that the above-mentioned process, based on the preservation of the product by means of plastic bags, besides degrading the quality (acrid smell of the dry cooked paste), requires the use of plants, processes and packages of very high cost.

In the techniques of preserving stuffed pastes attemps have also been made to use germicide lamps or irradiations, for example gamma rays, emitted by radioactive isotopes. This sterilization process, principally based on the radiations, obviously involves very complex plants of high cost which considerably affect the cost of the product, which, as it is well known, is of large consumption.

At present, with the exception of drying, no other of the processes referred to above is widely used on an industrial scale for the preservation of stuffed alimentary pastes because of the numerous inconveniences ascertained. As a consequence generally in practice stuffed alimentary pastes do not undergo particular treatments for their prolonged preservation, but are generally subjected to the normal drying as used for the common alimentary paste. This drying which substantially consists in the dehydration of the just obtained product can be carried out in a normal environment by exposing, for example, the product to sunshine or in a fresh and dry environment or placing the product in special driers with periodical ventilation.

The product which has undergone a normal drying can be stored for a rather short period, generally varying from some days to some weeks, depending upon the composition of the stuffing, the equipment used for drying and the carefulness observed by the producer. It will be understood that even if a proper drying of the outer paste shell were reached, it would not be possible to store the inner stuffing for a long time with such a normal process, because the stuffing is composed substantially of fresh force meat or sausage meat, cheese, vegetables and other similar products. These products are, in fact, perishable and may go rancid because of the alterations occurring in the fatty substances contained therein.

The total or partial elimination of such inconveniences would be possible by the use of chemical additives, which, however, are usually mistrusted by the consumer, who will always prefer natural products made up without the addition of such chemical ingredients.

It is an object of this invention to provide a process for obtaining high quality sterilized enduring stuffed alimentary pastes, which will be highly efficient of low cost and allowing to use economically convenient plants and such as to impart to the product actual qualities of safe storage, for a long period of time.

It is another object of this invention to provide a process for the treatment of stuffed pastes such as to impart to them good storage characteristics without involving the need for special preservation containers of the product.

It is another important object of this invention to provide a process which is absolutely independent of the hygroscopic, atmospheric or ambient conditions.

In fact, as it is well known, in the conventional drying process a great attention should be given to the atmospheric or ambient humidity, this being quite a determining factor for the end results. Such attention which in the conventional drying requires adequate plants provided with humidistats or a particular care on the part of the man in charge with the drying operations is reduced to a very little minimum in the process according to this invention.

These and other objects are attained by the process according to this invention for the sterilization and preservation of stuffed pastes such as ravioli, tortellini and the like, which is characterized in that it comprises at least a stage in which the product is put in a high humidity medium at high temperature and at least a stage in which the product is subsequently put in an environment i.e. a furnace or oven where it is subjected to such a temperature and for such a time as to cause the paste sterilization and at least the pasteurization of the stuffing.

According to the invention, the process for treating stuffed alimentary pastes in the form of the above described stuffed paste shells comprises immersing said stuffed paste shells into a liquid selected from the group consisting of water, broth and a mixture of water and oil, said liquid having a temperature of from 65 to 120° C., maintaining said stuffed paste shells in said liquid for a time interval of from 1 to 240 seconds, extracting said stuffed paste shells from the said liquid, heating said stuffed paste shells up to a heating temperature ranging from 70 to 225° C. and maintaining said stuffed paste shells at said heating temperature for a time period of from 30 seconds to 30 minutes. Advantageously the liquid is boiling water where said paste shells are maintained for a period from 1 to 240 seconds and after the extraction from the boiling water, said paste shells are heated up to a temperature of from 105 to 225° C., at which the said shells are maintained for a time ranging from 30 seconds to 30 minutes.

The process according to this invention will now be described more in detail with reference to the accompanying drawing diagrammatically representing by way of a non-limiting example a plant for processing on industrial scale stuffed alimentary pastes.

The stuffed paste shells 1, for example ravioli, produced in the conventional manner by a per se known machine, which is not represented in the drawing, are introduced, through a conveying mechanism with belt conveyor 2 into an elongated container 3 in which by not represented heating means a liquid 4 which can be water, broth, water with addition of oil, water with addition of sodium chloride (coarse salt), sodium carbonate or other substances capable of hindering the oxidation of the paste surface and cause the distruction of some enzymes which cause the paste surface to become brown, is kept warm or in boiling condition. The suffed paste shells 1 falling in said liquid 4 deposited on a belt conveyor 5 immersed in the liquid 4 and which moves the shells 1 towards the end 3' of the container 3 opposite to the end 3'' in which the shells are introduced. Since at least a part of the shells 1 may float on the liquid 4, the belt conveyor is provided with paddles fastened on the bottom of the conveyor belt immersed in the liquid and having their free end projecting from the liquid surface, so as to push ahead at the same speed rate both the stuffed paste shells 1 immersed in the liquid and deposited on the conveyor belt, as well as the stuffed paste shells floating on the liquid 4.

The time during which the shells 1 remain in the container 3 is regulated according to the temperature of the liquid 4 and depending upon the humidity degree of the paste to be processed. Such time may vary from a minimum of 1–40 sec. if the product is practically fresh, that is if the paste has a humidity varying from 30–35% to a maximum of 30–240 sec. if the paste is more dried, that is if same practically has a humidity degree varying from 7 to 30%. Obviously the immersion time depends also on the size of the stuffed paste shells. Instead to pass the stuffed paste shells through the container 3 with liquid 4 the shells 1 may be passed through an environment or container saturated with steam, such as to superficially moisten the product.

In order to facilitate such moistening, the product can be previously cooled, in such a way that the difference in temperature facilitates condensation of steam on its surface.

At the end (3'') of container 3 a length of the conveyor belt is upwardly directed so that the conveyor belt leaves the container 3 and raises the product above the front edge of the container causing it to fall onto the stationary vibrating conveyor 7 leading towards an oven 8, preferably built in the form of a tunnel. The stationary vibrating conveyor 7, consisting preferably of stainless steel network, continually moved by an eccentric motion or by per se known mechanisms, such as for example "Dragoni spiders," comprising a plurality of actuating eccentric pins, imparting to the product 1 a jumping forward motion through the oven so that the stuffed paste shells do not stick either to the network or to each other.

At the outlet of oven 8 the product 1, already superficially dehydrated and with a minimum possibility of sticking may be passed in a further oven 10 through another mechanism 9 of a design similar to the vibratory conveyor 7, but with reciprocating motion, so as to leave the product in the oven for a longer period of time than the previous one and without the danger of sticking. The equipment may consist of one single oven with continuous movement, but in such a case the oven should be very long, so that the product remains therein during the time necessary for its sterilization without sticking at the beginning. However, it has been found that also a period of time not shorter than 3–4 min. can give appreciable advantages both in the drying and endurance because of the accomplished pasteurization (65°–85°) of the stuffing and sterilization of the paste (surface) of the product.

At the outlet of the oven 8 or oven 10 the processed product 1 may be discharged onto a conventional belt conveyor 11, consisting preferably of heat resisting material and conveyed to the cooling zone 12, for the cooling and final drying stages. It is to be noted, in fact, that after a certain sterilization and pasteurization time the product may be subjected to the final drying also with the normal and presently adopted conventional systems and is then packaged and sold or stored.

In the accompanying drawing there is represented for the cooling stage, a common drier 12 in which an intense air current generated by fans is directed from below against the still hot product, thus causing an immediate temperature drop and ensuring, therefore, a perfect pasteurization-sterilization process. In addition to the temperature lowering, the product undergoes an immediate strong dehydration without breakages or "blows" in the paste shells which, thanks to the already received treatment, suitably stands up to whatever subsequent accelerated ventilation and drying.

The number of driers arranged in consecutive order and the permanence of the product therein are chosen according to the final humidity degree which the operator desires to leave in the product itself. Subsequent to this, if desired, final drying stage, the product may be collected and packaged and put on trade, but, it has been found in numerous tests and experiments that excellent results are obtained when after the drying and cooling stage 12 the product is passed through an end oven through which, like in the previous ones, a vibrating belt conveyor or a normal endless belt conveyor is passed.

When the product is dried in the continuous driers 12 up to the desired limit, before being collected and packaged, it may be unloaded onto an elevator 13 putting it on the vibrating belt conveyor 14 or on a normal endless belt conveyor, and hence put in the oven 15 for a short period of time which causes with its high temperature a final superficial sterilization in the product.

By such last processing the product is sterilized against the unavoidable surface contaminations to which the product is subjected in the preceding drying stage while passing through the continuous driers and stationary net driers. From the outlet of the oven 15 the product drops directly into bags or other containers enclosing it immediately and sealing it when it is still hot in order to avoid external contaminations.

The previously described equipment is obviously suitable for process according to this invention to obtain a sterilization and storage treatment of stuffed pastes on industrial scale. It is, however, understood that the process according to this invention can be carried out with a different equipment e.g. for a reduced output.

The process may include several modifications among which the most important is the replacement of the immersion stage of the product 1 into the practically boiling liquid 4 of container 3, with a corresponding stage in which the product is put in a medium, preferably steam environment, in such a way as to create that humidity degree as necessary for the subsequent treatment of the paste in the heating oven.

It has been ascertained that the time during which the product 1 should remain inside the tunnel ovens 8 and 10 is conveniently comprised between 30 sec. and 30 min. when the oven temperature varies from 105 to 170° C. Good results have also been obtained with temperatures ranging from 70 to 225° C. At any rate, the duration of such stage may vary and depends upon:

(a) The humidity degree of the paste at the beginning of the treatment;

(b) The immersion time of the paste in the "bath" inside the container 3 or the exposure time of the product to the flow of the steam as previously described in connection with the modification of the process;

(c) The temperature of the liquid of the bath itself or the steam;

(d) The oven temperature;

(e) The humidity degree desired in the product itself at the end of the process.

With a treatment carried out at a temperature of the oven 10 lower than the minimum indicated a reduced preservation of the stuffing is obtained, whilst with a temperature higher than the highest temperature indicated, the paste constituting the shell generally shows antiesthetical roughnesses, cracks or small bubbles on the outer surfaces.

Although excellent results have been obtained by the adoption of the above-mentioned temperatures, it has been found convenient to subject the product, after the warm humidification stage 3, to a gradually decreasing high temperature within suitable tunnel ovens with a high temperature at the oven inlet and gradually decreasing temperatures towards the outlet. It has been found that the high initial temperature of the oven, since the product is still wet, permits a rapid heat transmission to the inside of the stuffed paste towards the stuffing, thus determining an effective and prolonged pasteurization or sterilization of the latter without the paste constituting the shell undergoing superficial alterations which are prevented by the subsequent decrease of temperature which is not such, however, as to affect the initial pasteurizing or sterilizing action.

The heating carried out in the oven as previously described determines obviously the swelling of the product because of the gaseous expansion of the inner stuffing due to both the partial dilatation of a part of its components and the partial vaporization of another part of the components. At any rate, this swelling is not accompanied with an opening of the paste shell nor with cracks which would make the product unacceptable.

This fact, as revealed by microscopic examinations, is due to the molecular transformation of the paste membrane constituting the shell both during the immersion stage in the boiling liquid or exposure to steam and to the immediate subsequent intense heating, which transformations impart to the paste particular plastic properties such as to even stand up considerable swellings.

It is to be pointed out finally that this invention allows to handle and make marketable also ravioli, tortellini, etc. produced with the "industrial paste" extruded through continuous presses, besides of course those products with the normal paste of the so-called "Bologna style" that is processed by kneading and rolling mills as used heretofore.

In fact, it was impossible heretofore to industrially produce ravioli, tortellini, etc. made up with industrial paste because it does not stick to itself and cannot, therefore, envelope hermetically the raviolo or tortellino, i.e. the paste shell may not be closed in a tight manner. Particularly the shell of the ravioli, progressively opens during the conventional drying, which drying is further much more difficult to be carried out due to the larger possibility of "blows" or breakages to which this type of paste is largely subjected as compared with the "Bologna style" paste, when subjected to the same drying conditions.

With the process according to the invention also the product made up with "industrial-type paste" undergoes a uniform cementation. Such cementation both in the paste itself and the connecting or sealing zones of the paste shell provides such a strong adhering inter-connection of the contacting parts that detachments or openings in whatever successive drying stage or during the cooking of the product cannot occur.

By the term "Bologna style" paste there is intended a paste processed in rolling mills which refine the paste and convert it in thin and opaque sheets of pastry, while by the term "industrial paste" it is here intended the paste which is extruded through extrusion presses and such paste has a darker colouring, it is vitreous and does not have the white hue as the "Bologna style" paste, the white hue of which is due to the crushing of the starch particles carried out by the rolling mills. The conventional drying processes referred to in this specification are described in the information bulletin "Braibanti," Anno II, N. 7, 8 and 9 (published by Dr. Ing. M. G. Braibanti and Co., Milano).

The process according to the invention has been experimented and carried out in practice and a few examples will illustrate the results obtained in the experimentations.

EXAMPLE 1

Stuffed paste shells known as ravioli, of an average size of 24 mm., in which the shell was made of "Bologna style" paste of hard wheat flour (semolina) and having a water content of about 30% were treated. The stuffing was made of forcemeat and the quantity of the stuffing was about 35% by weight of the total weight of a ravioli. The thickness of the paste wall surrounding the stuffing was about 1 mm. Such ravioli were immersed in boiling water at 100° C. and were maintained therein for 20 seconds. From the boiling water the ravioli were conveyed in the described manner in the tunnel oven 8 wherethrough the ravioli coming from the bath 4 are passed. The ravioli entering the tunnel oven had a surface temperature of about 76° C., while the temperature within the oven was of about 150° C. The entrance and the outlet of the tunnel oven remained open during the passage of the ravioli so that the pressure within the oven was the atmospheric one. The ravioli were maintained in the oven 8 for 4 minutes and after that they were conveyed into the oven 10. The tunnel oven 10 was subdivided into, three temperature zones, the first of 150° C., the second of 140° C. and the third of 130° C. In each zone the stuffed paste was maintained for 2 minutes, so that the passage through the oven 10 lasted altogether 6 minutes. The ravioli were then cooled and dried in the dried 12.

EXAMPLE 2

The process was carried out in the same manner as described in Example 1 with the exception that instead of the "Bologna style" paste the "industrial style" paste was used and instead of water a boiling broth was used in the humidification stage as the warm humidification fluid.

EXAMPLE 3

The process was carried out in the same manner as in Example 1 with the exception that the "Bologna style" paste contained eggs as ingredients.

EXAMPLE 4

The process was carried out in the same manner as in Example 2 with the exception that the "industrial style" paste contained eggs as ingredients.

The ravioli treated according to the process described and illustrated in the examples were of excellent quality and no deterioration of the product was observed after more than one month storage at ambient temperature.

A number of comparative tests on the ravioli treated in conformity with the process of this invention and the ravioli obtained in the conventional manner, were made.

The following characteristics were analysed and examined: shape, colour, external aspect, surface structure, break resistance, microscopic observation, impermeability, time of preservation.

The conventional ravioli had an average size of 22 mm. and had a paste shell of Bologna style paste having eggs as ingredients, while the stuffer substance was forcemeat.

From the following table the improved characteristics of the ravioli obtained according to the process of this invention may be clearly compared with the ravioli obtained according to the conventional methods.

TABLE I

| Kind of analysis | Conventional ravioli | Ravioli according to Examples 3 and 4. |
|---|---|---|
| 1. Shape | Usual | Usual. |
| 2. Collour | Opaque straw yellow | Bright citron yellow. |
| 3. External aspect | Opaque floury | Homogeneous surface bright, smooth, transparent; characteristics due to a thin transparent hyaline layer. |
| 4. Superficial structure observed in the microscope. | Frequent micro and macro splits allowing an easy rupture of the shell of the paste and a greater possibility of the infiltration of humidity and germs. | Very rare micro splits and a very compact structure with a physical integrity of the surface reducing the ruptures to a minimum. |
| 5. Break resistance | Compression force 450 gr. | Compression force 720 gr. |
| 6. Preservation test at 22° C. | After 12 days completely musty. | After 20 days unaltered. |

The break resistance was established by the compression force necessary for breaking the shell of the ravioli.

Microscopical observations

From the microscopical observations it was possible to deduce that in the paste shell of the ravioli obtained according to the process of this invention an amylaceous gelatinization took place, which was due to the heating of a previously wetted product.

Microscopical observations carried out for strata at different depth of the paste shell gave the same results, so that it was possible to conclude that the mentioned transformations involved all the shell and that the non-transformed integral granules of starch were cemented in a stable manner by the gelatinized starch.

The ravioli obtained according to the conventional methods had the usual aspect of the starch granules of a slightly softened normal flour with the same frequency of smaller granules with respect to the greater ones.

From the above description it will be obvious that equally good results may be obtained when using in the humidification stage either warm or boiling water, broth, alimentary oil containing water or even steam as warm humidification fluid. The temperature range of the humidification fluid may advantageously vary from about 65 to about 120° C. depending on the immersion time and the size of the paste shells.

The invention is susceptible to several changes and modifications without departing from the scope and spirit of the invention itself as hereinbefore described and defined by the appended claims.

We claim:

1. A process for treating stuffed alimentary paste in the form of stuffed paste shells selected from the group consisting of ravioli, tortellini and cannelloni, which comprises immersing said stuffed paste shells into a liquid selected from the group consisting of water, broth and a mixture of water and oil, said liquid having a temperature of from 65 to 120° C., maintaining said stuffed paste shells in said liquid for a time interval of from 1 to 240 seconds, extracting said stuffed paste shells from the said liquid, heating said stuffed paste shells up to a heating temperature ranging from 70 to 225° C. and maintaining said stuffed paste shells at said heating temperature for a time period of from 30 seconds to 30 minutes.

2. A process according to claim 1, wherein after the stage during which said paste shells are maintained for said time period of from 30 seconds to 30 minutes at the temperature of from 70 to 225° C. said paste shells are cooled and dried in a current of fresh air.

3. A process for treating stuffed alimentary paste in the form of stuffed paste shells selected from the group consisting of ravioli, tortellini and cannelloni, which comprises immersing the said paste shells in boiling water, maintaining said paste shells in said boiling water for a time period of from 1 to 240 seconds, extracting the said paste shells from the boiling water, heating said paste shells up to a temperature of from 105 to 225° C., maintaining the said shells at said temperature for a time ranging from 30 seconds to 30 minutes, cooling said stuffed paste shells up to the ambient temperature and drying the paste shells.

4. A process according to claim 3, wherein said paste shells are cooled and dried in a current of fresh air and wherein after the drying stage the surface of the paste shells is rapidly heated up to a sterilization temperature.

References Cited by the Examiner

UNITED STATES PATENTS

| | | | |
|---|---|---|---|
| 1,374,340 | 4/1921 | Vaudreuil | 99—355 |
| 1,674,555 | 6/1928 | Leone | 99—355 |
| 1,756,992 | 5/1930 | Quiggle | 99—85 X |
| 2,615,809 | 10/1952 | Jean | 99—85 |
| 2,704,723 | 3/1955 | Poole | 99—85 |
| 2,950,978 | 8/1960 | Milani | 99—85 X |

OTHER REFERENCES

Earle et al.: "Industrial and Engineering Chemistry," vol. 33, No. 5, May 1941, pp. 642–647.

Taglienti: "The Italian Cookbook," Random House, New York, 1955, pp. 67–69.

A. LOUIS MONACELL, *Primary Examiner.*

RAYMOND N. JONES, *Examiner.*